(12) United States Patent
Hsu et al.

(10) Patent No.: US 11,108,806 B2
(45) Date of Patent: Aug. 31, 2021

(54) SYSTEM FOR MANAGING INFORMATION SECURITY ATTACK AND DEFENSE PLANNING

(71) Applicant: KLICKKLACK INFORMATION SECURITY CO., LTD., Taipei (TW)

(72) Inventors: Chien-Yang Hsu, Miaoli County (TW); Ju-We Chen, Taipei (TW); Yi Lin, New Taipei (TW)

(73) Assignee: KLICKKLACK INFORMATION SECURITY CO., LTD., Taipei (TW)

( * ) Notice: Subject to any disclaimer, the term of this patent is extended or adjusted under 35 U.S.C. 154(b) by 130 days.

(21) Appl. No.: 16/410,382

(22) Filed: May 13, 2019

(65) Prior Publication Data
US 2020/0366703 A1    Nov. 19, 2020

(51) Int. Cl.
*H04L 29/06*    (2006.01)

(52) U.S. Cl.
CPC .......... *H04L 63/1433* (2013.01); *H04L 63/02* (2013.01); *H04L 63/0428* (2013.01); *H04L 63/1425* (2013.01); *H04L 63/1466* (2013.01); *H04L 63/20* (2013.01)

(58) Field of Classification Search
CPC . H04L 63/1433; H04L 63/02; H04L 63/0428; H04L 63/1425; H04L 63/1466; H04L 63/20
See application file for complete search history.

(56) References Cited

U.S. PATENT DOCUMENTS

| | | | | |
|---|---|---|---|---|
| 7,614,083 | B2* | 11/2009 | Khuti | H04L 63/02 726/22 |
| 10,237,296 | B2* | 3/2019 | Sivan | G06F 21/577 |
| 10,250,619 | B1* | 4/2019 | Park | H04L 63/18 |
| 10,440,044 | B1* | 10/2019 | Zini | H04L 63/1425 |
| 11,050,778 | B2* | 6/2021 | Paturi | H04L 67/1095 |
| 2005/0138426 | A1* | 6/2005 | Styslinger | H04L 63/083 726/4 |
| 2009/0208910 | A1* | 8/2009 | Brueckner | G09B 19/0053 434/11 |
| 2010/0138925 | A1* | 6/2010 | Barai | H04L 63/1433 726/25 |

(Continued)

*Primary Examiner* — Oleg Korsak
(74) *Attorney, Agent, or Firm* — Hershkovitz & Associates, PLLC; Abe Hershkovitz

(57) ABSTRACT

A system for managing information security attack and defense planning includes a hacker end, an observer end, and a manager end. The hacker end conducts a real-word hacking exercise to hack a targeted website through a monitoring and control server. The observer end monitors the hacker end. The manager end provides an analysis platform communicatively connected to the monitoring and control server. The hacker end and the observer end generate a first independent report and a second independent report respectively according to logged information during the real-world hacking exercise and respectively transmit the first independent report and the second independent report to the analysis platform through the targeted institution for analysis, allowing the manager end to generate a summary report including flaws and vulnerabilities in information security and transmit the summary report to the targeted institution for the targeted institution to objectively and effectively assess the summary report.

20 Claims, 4 Drawing Sheets

(56) References Cited

U.S. PATENT DOCUMENTS

2019/0190960 A1* 6/2019 Amro .................. H04L 43/04
2020/0351298 A1* 11/2020 Paturi ................. H04L 67/02
2021/0136101 A1* 5/2021 Ben-Yosef ............ H04L 63/20

* cited by examiner

SYSTEM FOR MANAGING INFORMATION SECURITY ATTACK AND DEFENSE PLANNING

BACKGROUND OF THE INVENTION

1. Field of the Invention

The present invention relates to a management system and, more particularly, to a system for managing information security attack and defense planning.

2. Description of the Related Art

Currently, popular information security management systems in the market generally evaluate website security risk through tests and/or product security inspection, which are mostly carried out manually or by tools to provide information logging only. Sometimes, certain providers of information security management systems hire actual hackers for hacking attack and the hacking results are available from the hackers. However, by and large, the hackers' approaches and the hacking results are not trustworthy to the providers in the field of information security management.

As disclosed in Taiwanese Patent Number 1515599, entitled "Computer program product and method for information security monitoring and defense" (hereinafter called prior art A), the prior art A is involved with a computer device through which a cloud virtual platform is provided in order to match with a virtual layer and a virtual machine, perform an information comparison step and a normal sequence step, and judge a sequence as an abnormal sequence when the sequence fails to pass the normal sequence step. Furthermore, as disclosed in Taiwanese Patent Number 1560569, entitled "Method and system for rapidly screening information security risk hosts" (hereinafter called prior art B), the method of the prior art B primarily includes host information collection, comparison between suspicious files and those in malicious file databases, calculation of risk value, screening of high-risk hosts, and generation of assessment reports.

As can be seen from the foregoing description, both the prior art A and the prior art B focus on prevention measures prior to occurrence of hacking, which are nothing but pre-caution schemes and thus fail to acquire effective, trustworthy and highly secured analysis results targeting at hackers' actual hacking behaviors and approaches. As far as the issues of incredibility and implausibility attributable to the pre-caution schemes of the conventional techniques created by hackers hired by current providers of information security management systems are concerned, better solutions need to be provided to tackle the issues.

SUMMARY OF THE INVENTION

An objective of the present invention is to provide a system for managing information security attack and defense planning, which is involved with a hacker, an observer and a third-party monitoring and auditing scheme for generating a summary report in an objective and effective fashion, ensuring enhanced credibility and security on an assessed result of the summary report.

To achieve the foregoing objective, the system for managing information security attack and defense planning includes a monitoring and control server, a hacker end, an observer end, and a manager end.

The monitoring and control server is communicatively connected to a targeted website provided by a targeted institution.

The hacker end is communicatively connected to the monitoring and control server and conducts a real-world hacking exercise to hack the targeted website.

The observer end is communicatively connected to the hacker end.

The manager end is communicatively connected to the observer end and provides an analysis platform and the monitoring and control server. The analysis platform is communicatively connected to the observer end and the monitoring and control server.

The hacker end and the observer end generate a first independent report and a second independent report respectively according to logged information during the real-world hacking exercise and transmit the first independent report and the second independent report to the targeted institution, the targeted institution generates a piece of recorded information and forwards the first independent report, the second independent report, and the piece of recorded information to the analysis platform provided by the manager end for the manager end to generate a summary report including flaws and vulnerabilities in information security and transmit the summary report to the targeted institution.

Based on the foregoing system, the hacker end conducts the real-world hacking exercise to hack the targeted website through the monitoring and control server, the observer end simultaneously monitors the hacker end, and the manager end provides the analysis platform and the monitoring and control server. The analysis platform is communicatively connected to the observer end and the monitoring and control server. The hacker end and the observer end generate the first independent report and the second independent report respectively according to logged information during the real-world hacking exercise. After the first independent report and the second independent report are sent to the analysis platform for analysis through a targeted institution, the manager end can thus generate the summary report with the flaws and vulnerabilities in information security and transmits the summary report to the targeted institution. Accordingly, the summary report can be objectively and effectively assessed to enhance credibility and security of the assessed results.

Other objectives, advantages and novel features of the invention will become more apparent from the following detailed description when taken in conjunction with the accompanying drawings.

DETAILED DESCRIPTION OF THE INVENTION

Figure 1:
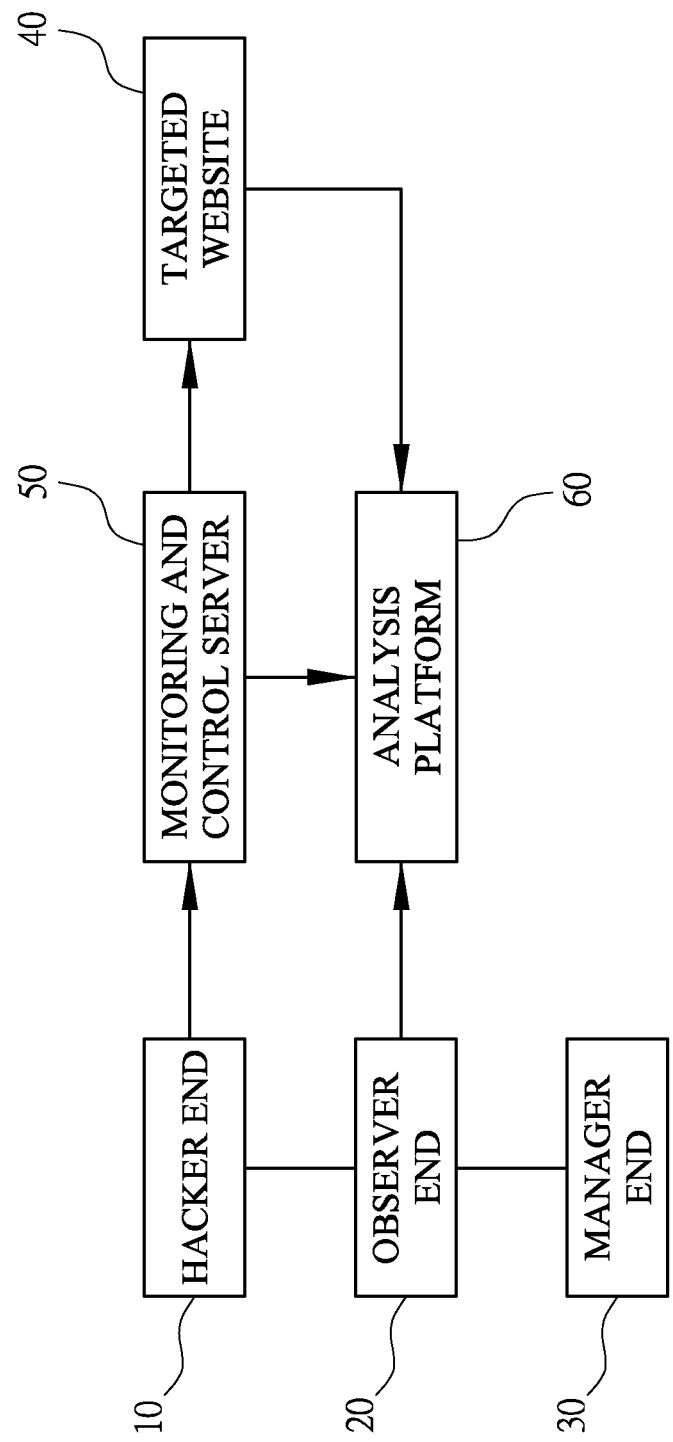
FIG. 1 is a functional block diagram showing system architecture of a system for managing information security attack and defense planning in accordance with the present invention.

With reference to FIG. 1, a system for managing information security attack and defense planning in accordance with the present invention includes a hacker end 10, an observer end 20, a manager end 30, a targeted website 40, a monitoring and control server 50, and an analysis platform 60. The targeted website 40 is provided by a targeted institution. The monitoring and control server 50 is communicatively connected to the targeted web site 40. The hacking end 10 conducts a real-world hacking exercise to hack the targeted website 40 through the monitoring and control server 50. The observer end 20 monitors the hacker end 10. The manager end 30 audits the hacker end 10 and the observer end 20. The manager end 30 provides the analysis platform 60 and the monitoring and control server 50. The analysis platform 60 is communicatively connected to the observer end 20 and the monitoring and control server 50.

The hacker end 10 and the observer end 20 generate a first independent report and a second independent report respectively according to logged information during the real-world hacking exercise and respectively transmit the first independent report and the second independent report to the analysis platform 60 through the targeted institution for analysis, allowing the manager end 30 to generate a summary report including flaws and vulnerabilities in information security and transmit the summary report to the targeted institution for the targeted institution to objectively and effectively assess the summary report. The resultant benefits may include better credibility to the involved team, higher security, minimum resource consumption, more effective supervision, penetration tests to targeted website domain, and fully hacker-simulated cyber attack.

Figure 2:
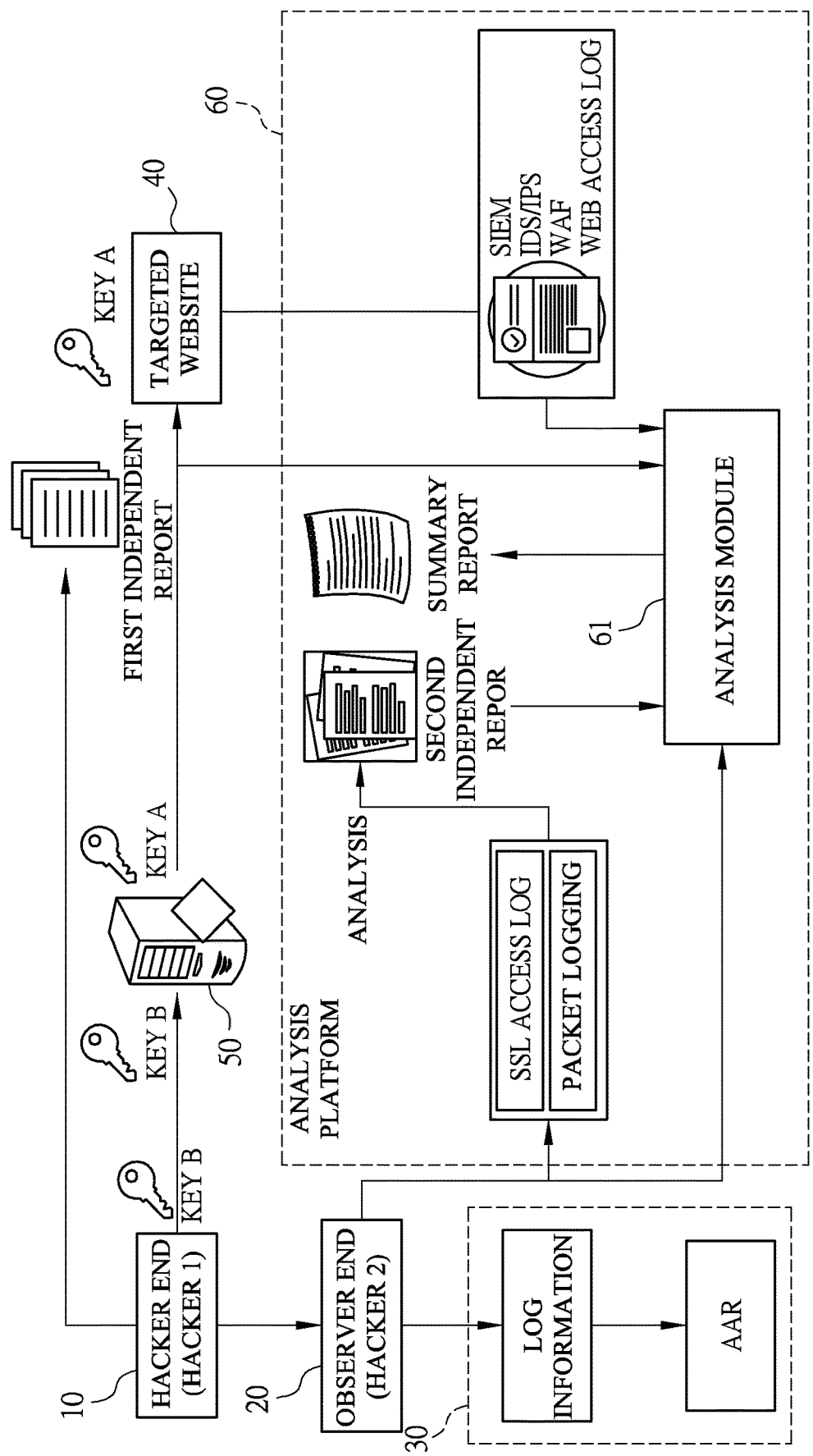
FIG. 2 is a functional block diagram showing an application of the system in FIG. 1.
Figure 3:
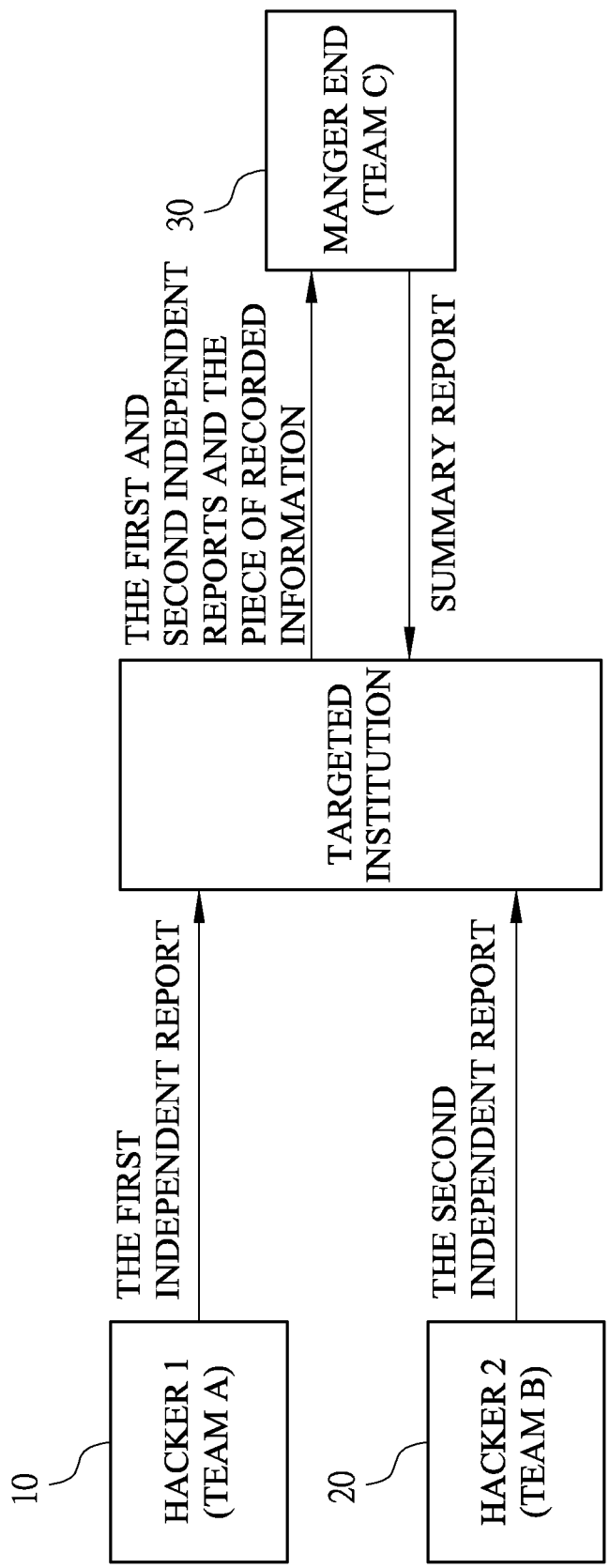
FIG. 3 is a functional block diagram showing entities involved in the system in FIG. 1.

With reference to FIGS. 2 and 3, the hacker end 10 (Hacker 1, Team A) is constituted by a first computer operated by a first hacker and is communicatively connected to the monitoring and control server 50, the observer end 20 (Hacker 2, Team B) is constituted by a second computer operated by a second hacker and is communicatively connected to the hacker end 10, and the manager end 30 (Team C) is constituted by a third computer operated by a management staff and is communicatively connected to the observer end 20. The manager end 30 not only logs information generated during the real-world hacking exercise but performs an after action review (AAR) procedure according to a result of executing the real-world hacking exercise.

In the present embodiment, the observer end 20 performs packet logging according to information of a secure protocol, such as SSL (Secure Socket Layer) Access Log, and generates the second independent report after analyzing the logged packets. The hacker end 10 and the observer end 20 respectively transmit the first independent report and the second independent report to the targeted institution. The targeted institution then generates a piece of recorded information and forwards the first independent report, the second independent report, and the piece of recorded information to the analysis platform 60 provided by the manager end 30 for analysis, such that the manager end 30 generates the summary report with the flaws and vulnerabilities in information security and sends the summary report to the targeted institution. When the targeted website 40 has SSL cryptographic functions, owing to the SSL cryptographic functions pre-configured to employ a dynamic key (Key A), which varies from one SSL connection to another SSL connection and is unavailable to the intermediate monitoring and control server 50 between the hacker end 10 and the targeted website 40, the monitoring and control server 50 fails to decrypt SSL traffic over a SSL connection between the hacker end 10 and the targeted website 40. To cope with the issue of the dynamic key, the manager end 30 generates a static key (Key B) and offers the hacker end 10 and the monitoring and control server 50 the static key. Thus, the hacker end 10 may employ the static key to encrypt SSL traffic over a SSL connection between the hacker end 10 and the targeted website 40. As a result, the SSL traffic over the SSL connection between the hacker end 10 and the targeted website 40 can be fully decrypted and recorded by the monitoring and control server 50. The piece of recorded information mentioned earlier includes information associated with Security Information and Event Management (SIEM), an Intrusion Prevention System (IPS), an Intrusion Detection System (IDS), a Web Application Firewall (WAF), or a Web Access Log.

The analysis platform 60 further has an analysis module 61. The targeted institution transmits the first independent report, the second independent report, and the piece of recorded information to the analysis module 61. Then, the analysis module 61 generates the summary report according to the first independent report, the second independent report and the piece of recorded information and transmits the summary report to the targeted institution.

Furthermore, when acquiring the first independent report, the second independent report and the piece of recorded information, the analysis module 61 of the analysis platform 60 performs a cross analysis procedure in generation of the summary report with the flaws and vulnerabilities in information security. In the present embodiment, the cross analysis procedure includes a hacking method analysis and an information leakage analysis. As such, the manager end 30 is allowed to generate the summary report, record the pieced of recorded information, and perform the AAR procedure according to the summary report and the piece of recorded information.

Figure 4:
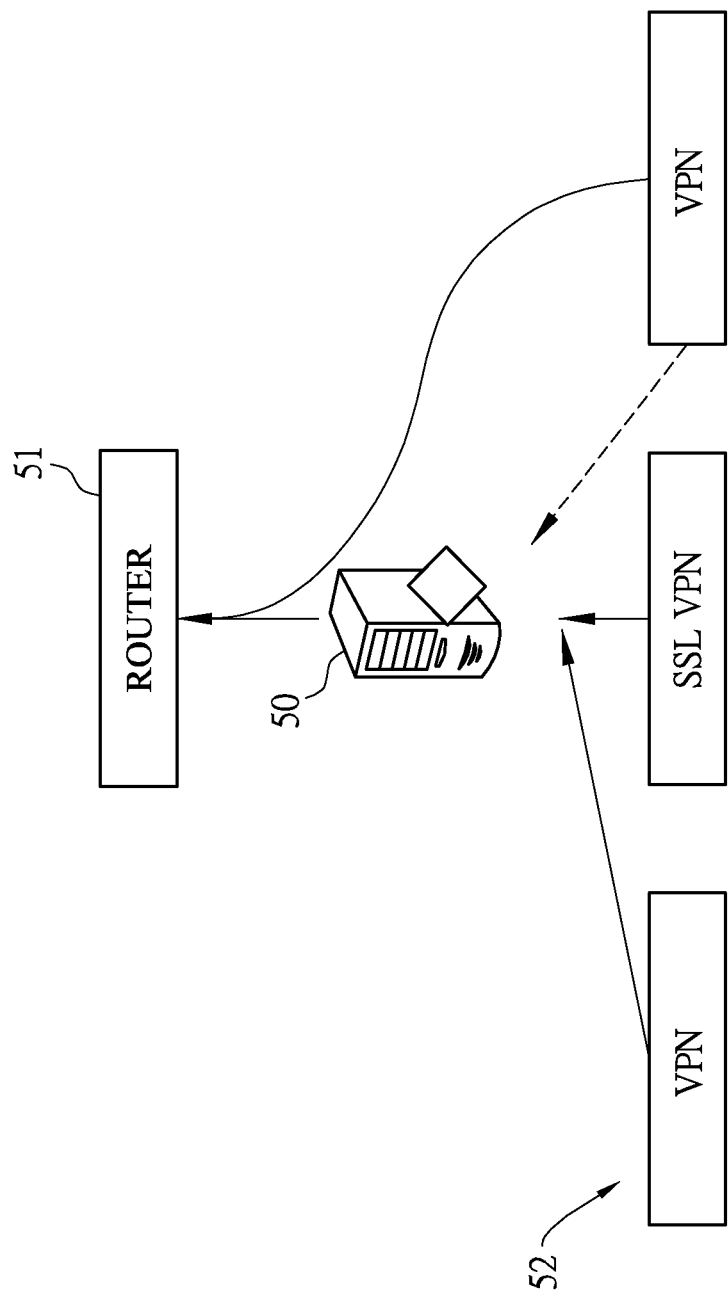
FIG. 4 is a functional block diagram showing a networking environment associated with a monitoring and control server of the system in FIG. 1.

In the present embodiment, the monitoring and control server 50 is provided by the manager end 30. With reference to FIG. 4, the monitoring and control server 50 is communicatively connected to multiple network devices 52 via a router 51. The multiple network devices 51 include networking equipment in each local area network (LAN) and each wide area network (WAN), such as VPN (Virtual Private Network), SSL VPN and the like.

By virtue of the application of the embodiment, the hacker end 10 is allowed to conduct a real-world hacking exercise to hack the targeted website 40 through the monitoring and control server 50. Meanwhile, the observer end 20 is able to monitor the hacker end 10, and the manager end 30 audits the hacker end 10 and the observer end 20. As the manager end 30 is the one that provides the analysis platform 60 and the monitoring and control server 50, the summary report can be assessed in an objective manner. The analysis platform 60 is connected to the observer end 20 and the monitoring and control server 50. The hacker end 10 and the observer end 20 further generate the first independent report and the second independent report respectively according to the piece of recorded information acquired during the real-world hacking exercise. After the targeted institution sends the first independent report and the second independent report to the analysis platform 60 for the analysis platform 60 to perform an objective analysis thereon, the manager end 30 generates the summary report, thereby ensuring fulfillment of an objective and effective analysis on the summary report and providing benefits including better credibility to the involved team, higher security, minimum resource consumption, more effective supervision, penetration tests to targeted website domain, and fully hacker-simulated cyber attack.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A system for managing information security attack and defense planning, comprising:
   a monitoring and control server communicatively connected to a targeted website provided by a targeted institution;
   a hacker end communicatively connected to the monitoring and control server and conducting a real-world penetration test to hack the targeted website through the monitoring and control server;
   an observer end communicatively connected to the hacker end; and
   a manager end communicatively connected to the observer end and providing an analysis platform and the monitoring and control server, wherein the analysis platform is communicatively connected to the observer end and the monitoring and control server;
   wherein the targeted website and the hacker end do not directly communicatively connect with each other, but rather indirectly communicatively connect with each other through the monitoring and control server;
   wherein the hacker end and the observer end generate a first independent report and a second independent report, respectively, according to logged information during the real-world penetration test and transmit the first independent report and the second independent report to the targeted institution, the targeted institution generates a piece of recorded information and forwards the first independent report, the second independent report, and the piece of recorded information to the analysis platform provided by the manager end for the manager end to generate a summary report including flaws and vulnerabilities in information security and transmit the summary report to the targeted institution.

2. The system as claimed in claim 1, wherein the observer end performs packet logging according to information of a secure protocol and generates the second independent report.

3. The system as claimed in claim 1, wherein when the targeted website has SSL (Secure Socket Layer) cryptographic functions, the cryptographic functions are pre-configured to employ a dynamic key disallowing the monitoring and control server to decrypt SSL traffic over a SSL connection between the hacker end and the targeted website, the manager end generates a static key and offers the hacker end and the monitoring and control server the static key for the hacker end to employ the static key to encrypt SSL traffic over the SSL connection between the hacker end and the targeted website and for the monitoring and control server to decrypt and record the SSL traffic over the SSL connection between the hacker end and the targeted website.

4. The system as claimed in claim 1, wherein the manager end logs information generated during the real-world penetration test and performs an after action review (AAR) procedure according to a result of executing the real-world penetration test.

5. The system as claimed in claim 3, wherein the piece of recorded information includes information associated with Security Information and Event Management (SIEM), an Intrusion Prevention System (IPS), an Intrusion Detection System (IDS), a Web Application Firewall (WAF), or a Web Access Log.

6. The system as claimed in claim 1, wherein the analysis platform further has an analysis module, the targeted institution transmits the first independent report, the second independent report, and the piece of recorded information to the analysis module, and the analysis module generates the summary report according to the first independent report, the second independent report and the piece of recorded information and transmits the summary report to the targeted institution.

7. The system as claimed in claim 2, wherein the analysis platform further has an analysis module, the targeted institution transmits the first independent report, the second independent report, and the piece of recorded information to the analysis module, and the analysis module generates the summary report according to the first independent report, the second independent report and the piece of recorded information and transmits the summary report to the targeted institution.

8. The system as claimed in claim 3, wherein the analysis platform further has an analysis module, the targeted institution transmits the first independent report, the second independent report, and the piece of recorded information to the analysis module, and the analysis module generates the summary report according to the first independent report, the second independent report and the piece of recorded information and transmits the summary report to the targeted institution.

9. The system as claimed in claim 4, wherein the analysis platform further has an analysis module, the targeted institution transmits the first independent report, the second independent report, and the piece of recorded information to the analysis module, and the analysis module generates the summary report according to the first independent report, the second independent report and the piece of recorded information and transmits the summary report to the targeted institution.

10. The system as claimed in claim 5, wherein the analysis platform further has an analysis module, the targeted institution transmits the first independent report, the second independent report, and the piece of recorded information to the analysis module, and the analysis module generates the summary report according to the first independent report, the second independent report and the piece of recorded information and transmits the summary report to the targeted institution.

11. The system as claimed in claim 6, wherein when acquiring the first independent report, the second independent report and the piece of recorded information, the analysis module of the analysis platform performs a cross analysis procedure in generation of the summary report with the flaws and vulnerabilities in information security.

12. The system as claimed in claim 7, wherein when acquiring the first independent report, the second independent report and the piece of recorded information, the analysis module of the analysis platform performs a cross analysis procedure in generation of the summary report with the flaws and vulnerabilities in information security.

13. The system as claimed in claim 8, wherein when acquiring the first independent report, the second independent report and the piece of recorded information, the analysis module of the analysis platform performs a cross analysis procedure in generation of the summary report with the flaws and vulnerabilities in information security.

14. The system as claimed in claim 9, wherein when acquiring the first independent report, the second independent report and the piece of recorded information, the analysis module of the analysis platform performs a cross analysis procedure in generation of the summary report with the flaws and vulnerabilities in information security.

15. The system as claimed in claim 10, wherein when acquiring the first independent report, the second independent report and the piece of recorded information, the analysis module of the analysis platform performs a cross analysis procedure in generation of the summary report with the flaws and vulnerabilities in information security.

16. The system as claimed in claim 11, wherein the cross analysis procedure includes a hacking method analysis and an information leakage analysis.

17. The system as claimed in claim 12, wherein the cross analysis procedure includes a hacking method analysis and an information leakage analysis.

18. The system as claimed in claim 13, wherein the cross analysis procedure includes a hacking method analysis and an information leakage analysis.

19. The system as claimed in claim 14, wherein the cross analysis procedure includes a hacking method analysis and an information leakage analysis.

20. The system as claimed in claim 15, wherein the cross analysis procedure includes a hacking method analysis and an information leakage analysis.

* * * * *